United States Patent [19]

Wiacek

[11] 4,433,035
[45] Feb. 21, 1984

[54] CATALYTIC CATHODE COMPOSITION FOR AIR-DEPOLARIZED CELL AND METHOD OF PREPARATION

[75] Inventor: Marian Wiacek, Mississauga, Canada

[73] Assignee: Duracell Inc., Bethel, Conn.

[21] Appl. No.: 315,320

[22] Filed: Oct. 26, 1981

[51] Int. Cl.³ .............................................. H01M 4/90
[52] U.S. Cl. ...................................... 429/27; 429/40; 429/42
[58] Field of Search ..................... 429/27, 40, 44, 224, 429/42

[56] References Cited

U.S. PATENT DOCUMENTS

| | | | |
|---|---|---|---|
| 3,306,779 | 2/1967 | Flannery et al. | 429/42 |
| 3,649,361 | 3/1972 | Paynter et al. | 429/13 |
| 3,704,171 | 11/1972 | Landi | 429/42 |
| 3,948,684 | 4/1976 | Armstrong | 429/115 |

FOREIGN PATENT DOCUMENTS 55-7666  2/1980  Japan ..................... 429/42

Primary Examiner—Donald L. Walton
Attorney, Agent, or Firm—Ronald S. Cornell; Israel Nissenbaum

[57] ABSTRACT

A catalytic cathode composition and method for the preparation thereof for an air-depolarized cell, said cathode comprising carbon activated with a metal permanganate such as $KMnO_4$, and an unactivated carbonaceous material such as virgin carbon black. The mixture optionally contains electrolytic $MnO_2$ and polytetrafluoroethylene.

11 Claims, No Drawings

CATALYTIC CATHODE COMPOSITION FOR AIR-DEPOLARIZED CELL AND METHOD OF PREPARATION

FIELD OF THE INVENTION

This invention relates to catalyzed cathodes for air-depolarized cells, and particularly for zinc-air cells.

BACKGROUND OF THE INVENTION

In the past, catalytic cathodes for zinc-air cells were generally of catalytic metal powders and more recently of activated carbon with catalytic metal oxides such as $MnO_2$. For example, Paynter et al., U.S. Pat. No. 3,649,361 issued Mar. 14, 1972, teach such a catalytic cathode comprised of a finely divided activated carbon powder and a catalyst material selected from a class consisting of a mixture of manganese dioxide and a manganese oxide and at least one other base metal catalyst.

Armstrong, U.S. Pat. No. 3,948,684 issued Apr. 6, 1976, teaches a process for preparing a gas permeable hydrophobic electrode structure (i.e., catalytic cathode) wherein a manganese dixoide catalyst is bound to both faces of a grid and a hydrophobic semi-permeable membrane is placed on one side of the coated grid. The manganese dioxide is produced in situ by decomposing an alkaline metal permanganate on an activated carbon substrate.

SUMMARY OF THE INVENTION

It is an object of the present invention to provide a novel catalyst mix for use in a catalytic cathode for air-depolarized cells, wherein operating characteristics are improved and costs are decreased. This and other objects, features and advantages of the present invention will become more evident from the following discussion.

Generally, the present invention comprises a catalytic cathode composition (and method of preparation) for air-depolarized cells comprising a carbonaceous material such as carbon black activated by a metal permanganate such as $KMnO_4$ admixed with an unactivated carbonaceous material such as virgin carbon black. The $KMnO_4$ activated carbon black may be prepared by mixing virgin carbon black or an aqueous suspension thereof with an aqueous solution of the permanganate with either or both of the solutions being heated to facilitate the activation.

It is a feature of this invention that, when the $KMnO_4$-activated carbon black according hereto has been prepared, there is an amorphous form of manganese present in the activated carbon black, without the presence of crystalline $MnO_2$, but where the presence of the element manganese is known. Because the activated carbon black is homogeneous, and because x-ray diffraction analysis fails to reveal a specific and simple oxide of manganese, it is speculated that what is present is an amorphous oxide or oxides of manganese.

In addition to the $KMnO_4$ activation of the carbon, none of the above patents refer in any way, nor make allowance for, the addition of a non-activated; i.e., virgin, carbon black to the catalytic cathode. There are several important distinctions, apart from the fact of the activation of the carbon black, which distinguish activated carbon from virgin carbon black. They include the fact that activated carbon has a much higher bulk density than virgin carbon black, and has well known absorption properties. Further, activated carbon has higher electrical resistivity, or lower conductivity, than virgin carbon black.

It has been found that considerable savings and economies in cost, time and labor can be realized by using a quantity of virgin carbon black in accordance with the present invention, in the preparation of catalytic cathodes for zinc air cells and the like. These factors become significant when full scale production of zinc-air cells is contemplated, having regard to the cost of the delivered product to the market, and the evident savings which may be effected thereby.

It has additionally been noted that higher on load voltages than standard air-depolarized cells are possible using catalytic cathodes according to this invention, and that a longer life at a sustained voltage level, on load, is possible.

Accordingly, this invention provides improved zinc-air cells, and the like, which have improved operating characteristics on load, slightly higher on load voltages, and predictable and more closely controlled operating characteristics from cell to cell, thereby making the cells more attractive to the prospective user. This is especially notable when the cells produced are button cells, destined for use in electronic watches and calculators, hearing aids, and the like.

DESCRIPTION OF THE PREFERRED EMBODIMENTS

The invention is more clearly described hereafter, both with respect to the catalytic cathode composition, and with respect to the methods of preparation thereof particularly of the potassium permanganate activated carbon black which is used therein. Specific, non-limiting examples are given for the purpose of illustration, and reference is given to commercially available carbon black products which have been found to be particularly useful.

The catalyst mix of the preferred embodiment of the present invention is prepared from a mixture of dry powder materials, which comprises about 5-80% by weight of dried and pulverized $KMnO_4$-activated carbon black (with about 40% or more being preferred), about 5-80% by weight of virgin carbon black (with about 10-40% being perferred), and about 0-40% by weight of electrolytic $MnO_2$ (with about 10-30% being preferred). Similar ranges are applicable to catalyst mixes of activated and unactivated carbonaceous materials. Additionally, the catalyst mix may comprise 5-30% by weight of hydrophobic dispersion such as PTFE (polytetrafluoroethylene) or FEP (fluorinated ethylene propylene copolymer) by which a partially non-wettable cathode subassembly is achieved.

The $KMnO_4$-activated carbon may be prepared by a method in which virgin carbon black or an aqueous suspension thereof (deionized water) is admixed and agitated with a heated aqueous deionized water ($KMnO_4$ solution (60°-100° C.). The carbon black solution may also be heated to 60°-100° C. with such temperature between 60°-100° C. being maintained during agitation. After filtration, washing and drying, a solid $KMnO_4$ activated carbon black is obtained. The range of dry $KMnO_4$ used, expressed as above, is about 10-90% of the total weight of dry $KMnO_4$ plus virgin carbon black used. The preferred range is about 30% to about 60% by weight of the dry mixture of $KMnO_4$ and virgin carbon black.

The catalytic cathode is thereafter prepared by rolling a dough of the catalyst mix into a metal grid or screen, then drying and pressing a hydrophobic film (a hydrophobic microporous material such as PTFE, PCTFE (polychlorotrifluoroethylene) or equivalent) onto one side of the dried matrix/catalyzed cathode mix, and curing the resulting structure. The cathode is then cut to size and placed in the cell.

Certain commercially available carbon black products have been found to be particularly useful, both for purposes of preparation of the $KMnO_4$-activated carbon, and as the virgin carbon additive in the catalyst mix. They include the following:

(I) Shawinigan Black, 50% compressed. This product is available from Gulf Oil Canada Limited.

(II) Monarch 700. This product is available from Cabot Carbon of Canada Limited.

(III) Vulcan Xc-72-R. This product is available from Cabot Carbon of Canada Limited.

Though the preferred permanganate useful for the activation process is potassium permanganate, other metal permanganates such as of alkali and alkaline earth metals, including lithium, sodium, calcium are similarly useful. Similarly, though carbon black is the preferred material for being activated, other carbonaceous materials having similar properties such as charcoal, lamp black and graphite may also be utilized. Though not determinative with respect to the present invention it is preferred that the anode utilized in cells having the catalyzed cathode of the present invention be of zinc or amalgamated zinc and that the electrolyte be an aqueous alkaline solution such as a potassium hydroxide electrolyte. Other commonly used anode materials and electrolytes may be utilized with the cathodes of the present invention. Similarly, the present invention is utilizable in cell structures common to air-depolarized or zinc-air cells.

Several specific examples follow, for purposes of illustration of certain features of the present invention. Details described should, however, not be taken as limitations on the present invention. Unless otherwise indicated, all ratios and proportions are by weight.

EXAMPLE I 81.8 grams of potassium permanganate crystals are dissolved in a 1,250 ml. of deionized water. The solution is heated to 80° C. with 105 grams of carbon black (Shawinigan black, 50% compressed) being stirred into the heated solution at the rate of 7 grams per minute. The resulting slurry is continuously agitated for 90 minutes, at a temperature of 82° C. At this time, the absence of the characteristic $KMnO_4$ purplish color from the slurry indicates that the reaction is completed. The slurry is then cooled, and filtered, with the residue being washed in 250 ml. of isobutyl alcohol. The filtrate is analyzed, and found to contain no trace of Mn. Thereafter, the washed residue is dried at 70° C. for 10 hours. The dried cake is pulverized, to obtain $KMnO_4$-activated carbon black.

EXAMPLE II 163.6 grams of potassium permanganate crystals are dissolved in 1,300 ml. of deionized water. The $KMnO_4$ solution is then heated to 80° C., with 210 grams of Monarch 700 carbon black being slowly stirred into the heated $KMnO_4$ solution. The remaining steps are substantially the same as in Example I.

By examination, it was determined that each of the above catalyst mix samples contained an amount of manganese of fine amorphous form deposited on the surface of the carbon.

Certain catalyst mixes for preparation of catalyzed cathode subassemblies for use in air-depolarized cells are prepared, and the following examples are representative of them.

EXAMPLE III

The $KMnO_4$-activated carbon black of Example I is admixed with Vulcan Xc-72-R virgin carbon black, and electrolytic $MnO_2$ in a proportion of 58:19:23. This mixture is formed into a cathode sub-assembly as described above. The cell provides satisfactory on load performance, and a half life voltage of 1.31 volts.

A zinc-air button cell having 0.455 inches (1.16 cm) O.D. and 0.210 inches (0.53 cm) height is prepared with said cathode sub-assembly, having a single 0.016 inches (0.04 cm) diameter air access hole, and the cell is tested on a 625 ohm load.

EXAMPLE IV

The $KMnO_4$-activated carbon black of Example I is admixed with virgin Monarch 700 carbon black, and electrolytic $MnO_2$ in a proportion of 50:33:27. After preparation of catalyzed cathode sub-assembly (as described above) and assembly thereafter into a zinc air cell, made and tested as in Example III, the cell provides satisfactory on load performance, and a half life voltage of 1.32 volts.

EXAMPLE V

The $KMnO_4$-activated carbon black of Example I is admixed with virgin Monarch 700 carbon black, and electrolytic $MnO_2$ in a proportion of 60:20:20. After preparation of a catalyzed cathode sub-assembly as described above, and assembly thereafter into a zinc-air cell, made and tested as in Example III, the cell provides satisfactory on load performance, and a half life voltage of 1.32 volts.

EXAMPLE VI

The $KMnO_4$-activated carbon black of Example II is admixed with virgin Monarch 700 carbon black in a ratio of 70:30 and formed into a cathode sub-assembly as described above and assembly thereafter into a zinc-air cell, amde and tested as in Example III. The cell provides satisfactory on load performance, and a half life voltage of 1.26 volts.

EXAMPLE VII

The $KMnO_4$-activated carbon black of Example II is admixed with virgin Monarch 700 carbon black and electrolytic $MnO_2$ is a proportion of 58:19:23 and formed into a cathode sub-assembly as described above. A zinc-air cell prepared with said cathode sub-assembly and tested as in Example III exhibits satisfactory on load performance and a half life voltage of 1.28 volts.

In the examples noted above, the various mixes each provided very suitable and workable (rollable) doughs, and the different proportions are due, at least in part, because of the different bulk densities of the starting materials. In all cases, the same catalyst loading per square, of approximately 20-22 mg/cm$^2$ is provided. By this way, and using common components for assembly of the zinc-air cells, a direct comparison of the various catalyst mixes, their on load operation and half life voltages is obtained.

In all of the zinc-air cells referred to above, there is equal air access (and therefore oxygen access) to the cells. In other words, the cells are substantially cathode limited, with equal air access.

From all of the above, it will be seen that there are considerable savings and advantages to preparation of catalyzed cathode structures according to the present invention. They include the fact that, by using virgin, unactivated carbon black, there is considerable saving in time, because only a portion of the carbon black which is admixed into the catalyst mix needs to be activated. Because of the manner by which the activated carbon black is prepared according to this invention, the preparation can be approached and managed on a volume/time scale and resource management procedure.

The costs are lessened, not only because there are lower costs in the preparation of the activated carbon black, and costs of the requisite materials for that operation, there is also a reduction in energy requirements used for processing the catalyst mix.

Likewise, the reductions in processing time, and use of virgin carbon black materials, and electrolytic $MnO_2$ and easier preparation of the matrix/catalyzed cathode mix component, including the fact that the preparation is much more easily adaptable to mass production methods, gives rise to considerable savings in labor.

Because of differences in bulk densities, it should also be noted that catalyst mixes according to the present invention will cover considerably greater area of matrix, and thereby produce more cathode sub-assemblies for assembly into cells, than prior art catalysts comprising wholly activated carbon.

Other catalyst mixes are, of course, available within the limits discussed above, and other commercially available products may be utilized. All such embodiments and variations, however, will clearly fall within the ambit and scope of the appended claims.

What is claimed is:

1. A catalyst mix, for use as a cathode in an air depolarized cell, comprising a carbonaceous material, activated by a metal permanganate admixed with an unactivated carbonaceous material.

2. The catalyst mix of claim 1 wherein said carbonaceous materials are each comprised of carbon black.

3. The catalyst mix of claim 1 wherein said metal is potassium.

4. The catalyst mix of claim 1 wherein said metal permanganate-activated carbonaceous material comprises between 5 and 80% by weight of said mix and said unactivated carbonaceous material comprises between 5 and 80% by weight of said mix.

5. The catalyst mix of claim 4 wherein said mix is further comprised of up to 40% by weight thereof of electrolytic $MnO_2$.

6. The catalyst mix of claim 5 wherein said mix is further comprised of between 5 and 30% by weight thereof of an hydrophobic dispersion.

7. The catalyst mix of claim 6 wherein said hydrophobic dispersion is selected from polytetrafluoroethylene and fluorinated ethylene propylene copolymer.

8. A cathode subassembly, for an air depolarized cell, comprising a porous metal substrate having the catalyst mix of claim 1 therein and a hydrophobic film on one side thereof with said subassembly having been cured.

9. An air depolarized cell having a cathode comprised of the catalyst mix of claims 1, 2, 3, 4, 5, 6 or 7.

10. An air depolarized cell having the cathode subassembly of claim 8 as the cathode thereof.

11. The cell of claim 10 wherein said cell further contains a zinc anode and an alkaline electrolyte.

* * * * *